United States Patent [19]

Tran et al.

[11] Patent Number: 5,055,120
[45] Date of Patent: Oct. 8, 1991

[54] FLUORIDE GLASS FIBERS WITH REDUCED DEFECTS

[75] Inventors: Danh C. Tran, Bethesda; Reza Mossadegh, Silver Spring, both of Md.; Nicholas Garito, Fairfax, Va.; Mohamad Farid, Silver Spring, Md.

[73] Assignee: Infrared Fiber Systems, Inc., Silver Spring, Md.

[21] Appl. No.: 498,453

[22] Filed: Mar. 20, 1990

Related U.S. Application Data

[63] Continuation of Ser. No. 133,723, Dec. 15, 1987, abandoned.

[51] Int. Cl.$^5$ .................... C03B 37/027; C03B 37/012
[52] U.S. Cl. ........................................ 65/3.11; 65/71; 65/900; 65/DIG. 16
[58] Field of Search .................... 65/3.11, 3.1, 3.2, 71, 65/900, DIG. 16

[56] References Cited

U.S. PATENT DOCUMENTS

| | | | |
|---|---|---|---|
| 2,313,296 | 3/1943 | Lamesch | 65/3 |
| 2,980,957 | 4/1961 | Hicks. | |
| 3,245,770 | 4/1966 | Cortright | 65/71 |
| 3,711,262 | 1/1973 | Keck et al. | 65/3.12 |
| 3,737,292 | 6/1973 | Keck et al. | 65/3.12 |
| 3,853,521 | 12/1974 | Greenwood | 65/71 |
| 3,877,912 | 4/1975 | Shiraishi et al. | 65/DIG. 16 |
| 3,932,162 | 1/1976 | Blankenship | 65/3.12 |
| 3,958,970 | 5/1976 | Auzel | 65/33 |
| 4,065,280 | 12/1977 | Kao et al. | 65/DIG. 16 |
| 4,163,654 | 8/1979 | Krohn et al. | 65/2 |
| 4,199,335 | 4/1980 | Gliemeroth et al. | 65/2 |
| 4,243,398 | 1/1981 | Nomura et al. | 65/2 |
| 4,262,035 | 4/1981 | Jaeger et al. | 427/34 |
| 4,327,965 | 5/1982 | Black | 65/3.12 |
| 4,328,318 | 5/1982 | Miranday | 501/40 |
| 4,341,873 | 7/1982 | Robinson et al. | 501/40 |
| 4,343,638 | 8/1982 | Mitachi et al. | 65/2 |
| 4,505,729 | 5/1985 | Matsumura et al. | 65/3.11 |
| 4,519,826 | 5/1985 | Tran | 65/3.11 |
| 4,537,864 | 8/1985 | Tick | 501/30 |
| 4,602,926 | 7/1986 | Harrison et al. | 65/3.11 |
| 4,610,708 | 9/1986 | Sarhangi | 65/3.12 |
| 4,627,865 | 12/1986 | Roba | 65/DIG. 16 |
| 4,631,114 | 12/1986 | Schneider | 65/DIG. 16 |
| 4,636,235 | 1/1987 | Glessner et al. | 65/13 |
| 4,636,236 | 1/1987 | Glessner et al. | 65/3.12 |
| 4,639,079 | 1/1987 | Powers | 350/96.33 |
| 4,659,355 | 4/1987 | Maze et al. | 65/DIG. 16 |
| 4,674,835 | 6/1987 | Mimura et al. | 350/96.34 |
| 4,675,038 | 6/1987 | Ainslie et al. | 65/3.12 |
| 4,699,464 | 10/1987 | Cohen | 501/37 |
| 4,729,777 | 3/1988 | Mimura | 65/DIG. 16 |
| 4,734,117 | 3/1988 | Pilon | 65/DIG. 16 |
| 4,741,752 | 5/1988 | France | 65/DIG. 16 |

FOREIGN PATENT DOCUMENTS

| | | | |
|---|---|---|---|
| 182250 | 5/1986 | European Pat. Off. | 65/DIG. 16 |
| 58-204832 | 11/1983 | Japan | 65/900 |
| 59-03039 | 1/1984 | Japan | 65/DIG. 16 |
| 59-06825 | 2/1984 | Japan | 65/3.2 |
| 60-251140 | 12/1985 | Japan | 65/DIG. 16 |
| 7116691 | 6/1973 | Netherlands | 65/3.11 |

OTHER PUBLICATIONS

Tran et al.; Electronics Letters, vol. 18, No. 15, 7-2-2-82, pp. 657-658.

*Primary Examiner*—Kenneth M. Schor
*Attorney, Agent, or Firm*—Browdy and Neimark

[57] ABSTRACT

Improved fluoride glass optical fibers are produced by a process introducing several improvements in the production of fluoride glass preforms and the drawing of fibers therefrom. Reduced bubble formation and crystallization are obtained by vertically spinning a fluoride glass melt within a glass cladding tube at a high rotational speed, or alternatively, pouring a flouride glass core melt into a cladding tube while slowly raising the mold from an inclined position to a vertical position, or alternatively, introducing a core tube inside a cladding tube. The production of fibers is enhanced if at least one production phase, i.e., preform formation or fiber drawing, is conducted in an atmosphere containing reactive gases that scavenge molecules that could otherwise react with, hydrolyze and oxidize the fluoride glass. The disclosure also describes several devices uniquely useful in the process of the present invention. In another aspect of the present invention, fluoride glass fibers may be clad with a fluoropolymer which is coated with a polymerizable resin.

6 Claims, 8 Drawing Sheets

FLUORIDE GLASS FIBERS WITH REDUCED DEFECTS

This application is a continuation of application Ser. No. 07/133,723, filed Dec. 15, 1987, now abandoned.

BACKGROUND OF THE INVENTION

The present invention relates to fluoride glass fibers, and more particularly to fluoride glass optical fibers.

Fluoride glasses are non-oxide glasses. They are usually based on heavy metal fluorides such as $ZrF_4$, $HfF_4$ or $BaF_2$. They also include glasses based on $AlF_3$ and $BeF_2$, as well as fluoro-phosphate-based glasses. Unlike oxide glasses, fluoride glasses have a relatively high tendency toward devitrification and have to be quenched rapidly from the melt to avoid crystal formation.

At present, glass-clad fluoride glass optical fibers are generally prepared from preform drawing. Fluoride glass preforms are fabricated from rotational casting and built-in casting techniques which are widely used nowadays. In the rotational casting approach, molten fluoride cladding glass is cast inside a metallic mold pre-heated at the glass transition temperature (Tg); the mold is then rotated and the melt solidifies into a concentric and uniform tube. Finally, the molten core glass which has a higher refractive index than the cladding glass is poured into the tube to form a fluoride glass preform having a wave guide structure. The preform is then drawn into fibers using a resistance or RF induction furnace. In the built-in casting method, the cladding tube is prepared by casting the cladding glass melt inside a metallic mold and subsequently upsetting the mold to allow the still molten glass to flow out of the mold; the core melt is then introduced into the tube as in the rotational casting technique.

The rotational casting and built-in casting techniques are limited to small preforms. Scaling up to large-site preforms for long-length fiber fabrication results in the formation of crystalline defects and bubbles inside the core of the preform. For a large-size preform, large amounts of core melt must be used and thus the heat dissipation through the wall of the cladding glass tube is relatively slow. The slow cooling of the core melt results in crystal formation within the core. Bubbles in the core represent an additional source of scattering defects. They are formed by trapped gas which originates from turbulence when the core melt is poured into the tube.

Similar scattering centers, namely crystals and bubbles, can be observed in polymer-clad fluoride glass fibers. Present techniques for fabricating polymer clad fluoride fiber consist of casting the melt inside a metallic mold to form a solid fluoride glass rod. The rod is then drawn into fiber which is coated in line with a low refractive index polymer which acts as an optical cladding. Scaling up to large-size rod again results in crystallization due to the slow quenching of the melt and bubble formation due to turbulence.

OBJECTS OF THE INVENTION

It is an object of the present invention to overcome the aforementioned disadvantages of the prior art.

It is another object of the presentation to produce a fluoride glass optical fiber free or essentially free of bubbles and crystallization.

It is another object of this invention to fabricate a fluoride glass optical preform free or essentially free of bubble and crystal defects.

It is a further object of the present invention to provide an optical fiber having a core of relatively large or relatively small diameter and free or essentially free of crystallization.

It is yet another object of the present invention to provide a conveniently manufactured fluoride glass fiber essentially free of impurities and moisture which causes hydrolysis, oxidation and crystallization on the fiber.

It is still another object of the present invention to provide novel essentially defect free, fluoride glass fiber coated with a fluoropolymer clad and protected with a water resistant polymerizable resin.

SUMMARY OF THE INVENTION

The above objets, and others which will become apparent upon reading the instant disclosure, are achieved by various combination of novel, inventive steps.

A. Spinning process for making glass-clad fluoride glass fiber

The spinning process for making glass-clad fluoride fibers consists of casting the cladding glass melt inside a metallic mold pre-heated at Tg, then rotating the mold to form a cladding tube. Subsequently, the core glass melt is introduced into the tube which is in turn rotated to form a hollow tube preform. The tube preform is made of a clad, a core and a bore in the middle. In this novel approach, the heat dissipation from the core melt is accelerated by convection through the bore during spinning, thus preventing crystallization from occurring. In addition, bubble formation in the core can be eliminated since the bubbles, which are formed from turbulence, migrate toward and break at the core-bore boundary. The spinning technique also allows the fabrication of a tube preform having a pre-determined bore size or a pre-determined core thickness. Here, a pre-measured amount of core melt is used, so that when the melt is rotated the desired bore size is achieved.

B. In another embodiment of the present invention, a solid preform having a fluoride glass core and cladding may be formed by first spinning a clad glass vertically to eliminate all bubbles prior to it solidification. In order to prevent bubbles from being trapped in the core, the core must then poured inside the cladding tube with the mold initially maintained at a slightly inclined position from the horizontal plane and the mold slowly raised during pouring, until the clad glass hollow is filled and the mold is upright.

C. Spinning process for making polymer clad fluoride glass fiber

The spinning process can also be implemented in the making of low-loss polymer-clad fluoride fibers. It can be used to fabricate a fluoride glass tube free of crystals and bubbles. The tube can be collapsed to form a core rod before the fiber draw, or can be drawn directly into fibers. The fibers will then be coated in line with a low refractive index polymer cladding. The polymer optical cladding can also be put onto the fiber, by jacketing the tube or rod prepared via the spinning process with a fluoropolymer jacket having the same thermal drawing properties as the glass, and then drawing the jacketed tube or rod into polymer clad fibers. The polymer clad fluoride fibers are coated with a water resistant polymerizable resin.

D. Tube in tube process for making glass-clad fluoride glass fibers

In the tube-in-tube process, the cladding and core tubes are prepared separately, using the spinning process. The core tube outer surface is optically polished and is introduced inside the cladding tube to form a tube-in-tube preform. In this approach, the heat dissipation from the melt is even more accelerated via both conduction through the bore, and conduction through the metallic mold. In the tube-in-tube process a solid core rod can be used in lieu of the core tube. The core glass rod can be fabricated by the spinning process described above or by any other suitable process.

E. Drawing of fluoride glass preforms

Preforms prepared by the spinning or tube-in-tube or rod-in-tube processes can be collapsed and then drawn into fibers, or can be directly drawn into fibers. In the former approach, the preform is collapsed under an essentially inert (Ar, $N_2$, He, $O_2$) and/or reactive gas ($CF_4$, $CHF_3$, $SF_6$, $NF_3$, $SOCl_2$, $PF_5$, $CS_2$, $CCl_4$, $F_2$, $Cl_2$, plasma emitted F and Cl, all fluorocarbons) -containing atmosphere, or under vacuum. A specialized set up may be used for collapsing the preform. In the later approach, the preforms can be drawn directly into fibers without prior collapse. During the drawing of the uncollapsed preform, the bore of the preform is kept under an atmosphere consisting of a single one or a mixture of the gases mentioned above, or under vacuum. The outer surface of the preform is kept under an atmosphere consisting of a single one or a mixture of the gases mentioned above.

Tube preforms can be collapsed using a special apparatus. The preform can be moved through a narrow heat zone furnace. The temperature is raised to the softening temperature of the glass and the preform collapses. This is accomplished under an atmosphere consisting of a single one or a mixture of the gases mentioned above or under vacuum.

Reactive gases useful in the present invention, particularly during collapse or draw, include:
$CF_4$, $CHF_3$, $SF_6$, $NF_3$, $SOCl_2$, $PF_5$, $CS_2$, $CCl_4$, $F_2$, $Cl_2$, plasma emitted F and Cl, Freon 12, and Freon 22.

The above gases will prevent hydrolysis and oxidation by reacting with water according to the following typical equations:

$$XCl_4(g) \rightarrow XCl_2(g) + Cl_2(g)$$

$$XF_4(g) \rightarrow XF_2(g) + F_2(g)$$

$$2Cl_2(g) + 2H_2O(l) \rightarrow 4HCl(g) + O_2(g)$$

$$2F_2(g) + 2H_2O(l) \rightarrow 4HF(g) + O_2(g)$$

where X represents C, N, Si, W, S, P, B, a fluorocarbon group or hydrocarbon group.

For the plasma emitted F or Cl, the reactions are as follows:

$$4Cl(g) + 2H_2O(g) \rightarrow 4HCl(g) + O_2(g)$$

$$4F(g) + 2H_2O(g) \rightarrow 4HF(g) + O_2(g)$$

Of course essentially inert gases, such as Ar, $N_2$, $O_2$ or He may be employed alone. Preferably, the inert gases are mixed with a partial pressure of reactive gases sufficient to prevent hydrolysis and oxidation of the fluoride glass being processed. In order to eliminate trapped bubbles, the mold containing the cladding tube must be initially positioned at an angle to the horizontal of about 10°-30°.

In another embodiment of the present invention, bubble formation is reduced in the making of a solid preform. In this embodiment, the core melt is spun within the clad tube and then allowed to fall back within the clad tube, thus forming a solid preform. This preform may then be drawn into a fiber essentially as described above.

The process of the present invention is applicable to all fluoride glasses, including fluoro-phosphate-based glasses.

BRIEF DESCRIPTION OF THE DRAWINGS

The present invention will be readily understood by reference to the figures described below. In the figures, like elements are described by like reference numerals.

DETAILED DESCRIPTION OF THE PREFERRED EMBODIMENTS

Figure 1:
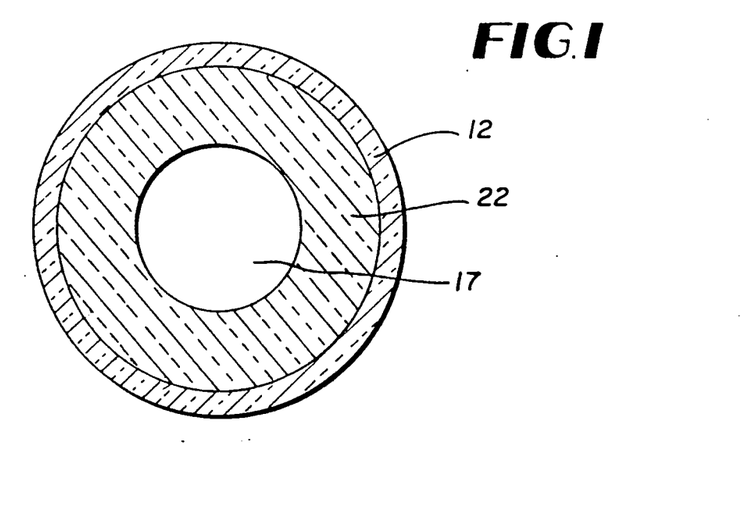
FIG. 1 shows a transverse cross-section of a spin-cast hollow preform produced according to the present invention.
Figure 2:
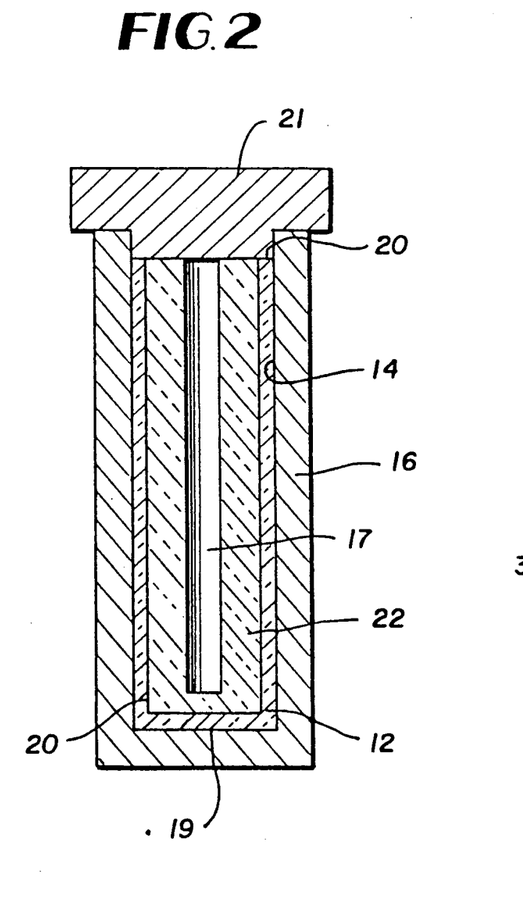
FIG. 2 is a schematic cross-section of a mold used for spin casting the preform of FIG. 1.

Referring to FIG. 2, fluoride glass clad tube 12 is formed on inner wall 14 of a thermally conductive metallic mold 16. Clad 12 tube is preferably made by rotational (spin) casting, but may be produced by a variety of methods used to form a clad tube independent from a core.

Once clad tube 12 has formed and has essentially solidified, a core melt of fluoride glass is poured into the hollow interior defined by the inner wall 19 of clad tube 12, while the mold, at Tg, is in thermal equilibrium with clad tube 12 and while mold 16 and cladding tube 12 are not rotating and are vertically oriented. The amount of fluoride glass core melt poured should be premeasured to obtain the desired core thickness.

Once the fluoride glass has been poured, retaining cap 21 is positioned within open end 20, and the vertically oriented mold is rotated at high speed greater than about 5000 rpm. Bubble formation is best avoided by spin-casting both the core 22 and clad while the mold is vertically oriented, open end up. When a vertically oriented mold is spun, two forces tend to remove bubbles from a glass melt therein. Centrifugal force pushes glass melt outwardly, and accordingly, the less dense trapped gas in the bubbles moves into bore 17. Also the glass melt flows downwardly relative to the less dense trapped gas in the bubbles, by virtue of gravitational force, causing bubbles and trapped gas to collect near the portion of mold 16. If only the top portion of the core or clad tube has bubbles, that portion may be disregarded and high quality fibers may be drawn from the remainder of the preform.

Once the core 22 has solidified, at about its Tg, bore 17 may be collapsed, or the hollow preform may be drawn directly into a fiber.

Typically, the mold is maintained at or near the Tg of the clad while the core melt is poured and the initial temperature of the core melt (preferably 500°-750° C.) is sufficiently low to avoid thermally stressing the clad tubing, as noted in Tran, U.S. Pat. No. 4,519,826, issued May 28, 1985 (incorporated herein by reference).

If the mold is spinning when glass melt is poured, control of the core or clad thickness becomes difficult, as significant amounts of core class melt would be spun out during high speed rotational casting of the clad. However, the non-rotating state of the mold while the melt is being poured requires that once pouring is completed, the rotational speed of the mold must increase quickly to that desired. Otherwise, the melt will solidify within the mold before the centrifugal force can remove bubbles and establish a layer of uniform thickness along the length of the mold.

The preferred rotational speeds during casting are above those mentioned in the aforementioned Tran patent. At the higher speeds used in the present invention, bubble formation is significantly depressed. Further, the higher rotational speed used according to the present invention helps maintain the evenness of the casted layer when the mold is vertically oriented throughout rotational casting. If the mold is horizontally, rather than vertically, oriented during the bulk of the rotational casting, the bubble-suppressing action of the rotational casting decreases, as the gravitational bubble-suppressing action described earlier is no longer a factor.

Figure 3:
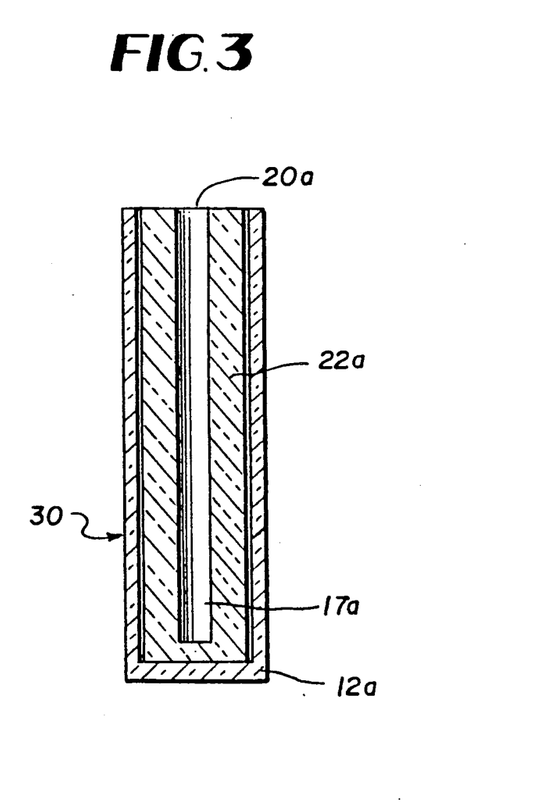
FIG. 3 shows a tube-in-tube preform produced according to the present invention.

Alternatively, a preform 30 according to the present invention may be produced by a tube-in-tube process as shown in FIG. 3. In that process, a previously formed core tube 22a or a solid rod (not shown) of a diameter just small enough to be easily slid with clad tube 12a, is optically polished and inserted into clad tube 12a. The core tube 22a or the solid rod and clad tube 12a are then heated to near their softening point so that fusion, without melting occurs. Thus, a stepped index hollow preform 30 results where core tube 22a is hollow. This preform 30 may then be collapsed, to close bore 17a, during drawing. Alternatively, preform may be drawn directly into a fiber without collapsing bore 17a.

Core tube 22a and clad tube 12 may have one or two open ends or a solid core rod may be used in place of a core tube. Core tube 22a or the solid core rod and clad tube 12a can be formed using any process useful in casting fluoride glass tubes or rods of optical quality. Preferably, both core tube 22a and clad tube 12a are rotationally casted at high speed in individual, respectively sized, vertically oriented, thermally conductive, metallic molds.

The hollow preform may be entirely collapsed using a variety of methods.

Figure 4:
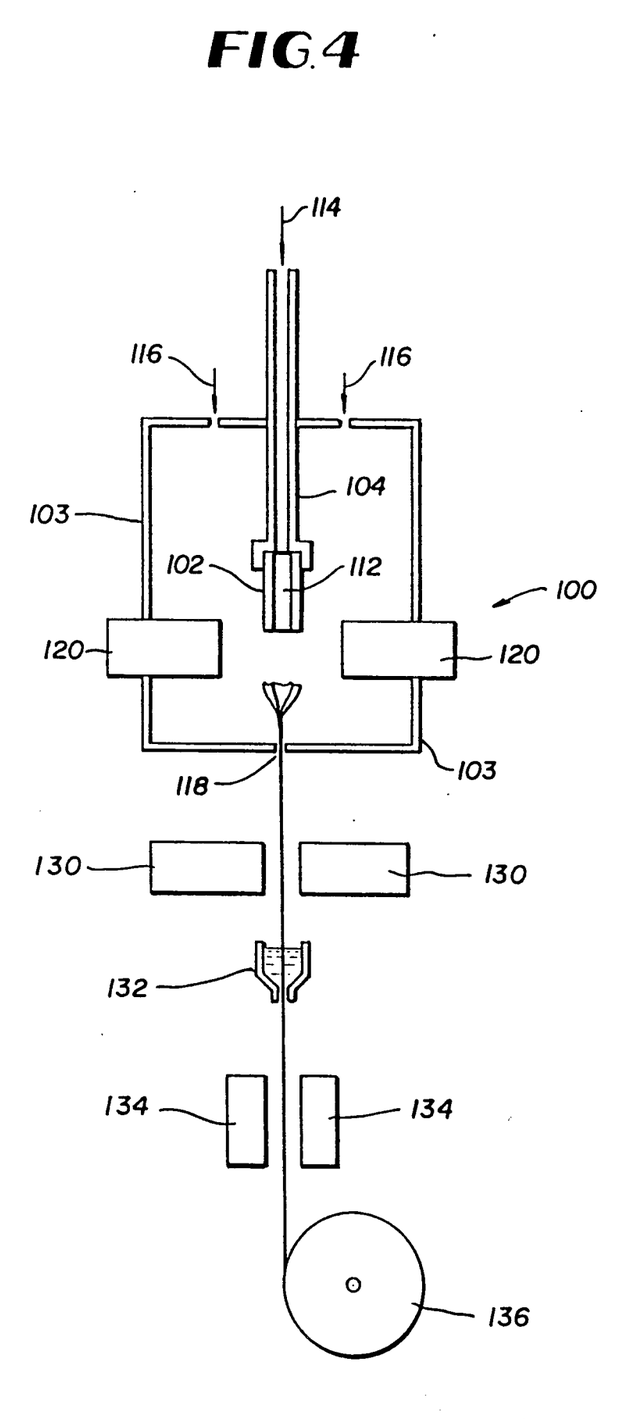
FIG. 4 shows an arrangement useful for collapsing and drawing a preform according to the method of the present invention.

FIG. 4 shows a preferred apparatus 100 for collapsing or drawing a hollow preform 102 or for drawing a rod-in-tube preform (not shown). Hollow preform 102, or the rod-in-tube preform, is placed within a furnace equipped with two glass domes 103. The perform is held by chuck 104. Inert or react gas (preferably reactive gas mixed with inert gas) enters bore 112 from supply 114 and enters domes 103 through port 116 and exits through outlet 118. The gas acts as a scavenging gas which reacts with undesired water molecules and prevents hydrolysis and oxidation of the fluoride glass, as described earlier, to form gaseous and/or solid flowable particulate products and by-products that exit through port 118. A furnace 120 then induction heats preform 102 to collapse the same. The bore may also be kept under vacuum during collapse.

After the preform has been collapsed, if collapse is desired, it is drawn into an optical fiber. During drawing, a flow of reactive and/or inert gas is continued inside the glass domes and furnace. During drawing, the preform maybe translated through the furnace. The fiber is drawn and exits through port 118. Of course, in the method of drawing just described, collapse or closure of even a hollow preform is unnecessary, since the continuous maintenance of the hollow preform within a reactive atmosphere prevents contamination of the bore. Laser micrometer 130 assures that the fiber can be drawn to the desired thickness. The drawn fiber is wound onto take-up reel 136.

The above process can be applied when the preform is directly drawn into fibers without the collapsing step.

Additionally, the present invention encompasses a novel method of producing a polymer clad fiber with a water-resistant polymerizable resin. At present, polymer cladding materials used for fluoride glass fibers are based on fluorinated ethylene propylene (FEP). The FEP materials generally have a high water permeability and allow water to diffuse through and attack the glass surface. FEP-clad fluoride fibers age rapidly in with liquid water and become weak. To make FEP-fiber useful, it is suggested that a low water content polymerizable resin, such as the UV acrylates, be coated over the FEP cladding. A fluoride glass preform or core may be inserted within a polymer sleeve, preferably of FEP, of slightly larger diameter.

The core may be a hollow tube or solid rod. If the preform or core within this sleeve is hollow, it is preferably collapsed using the apparatus of FIG. 4 prior to insertion within the sleeve, or, the sleeve is made to seal only the outer periphery of the hollow preform, so that the sealed preform may be set within the apparatus of FIG. 4 and gas flowed into an open end of the hollow center thereof. Alternatively, the hollow preform may be closed, using an apparatus like that of FIG. 4, sealed by the sleeve, cut to open one end, chucked within the apparatus of FIG. 4, and drawn as described above. The polymer clad fiber is drawn through a coating cup 132 filled with water-resistant polymerizable resin which is then cured thermally or with UV light in curing oven 134 as shown in FIG. 4.

In yet another embodiment of the present invention, a solid preform having a fluoride glass core and cladding may be formed by pouring a fluoride glass core melt into a fluoride glass cladding tube within a mold as depicted in FIG. 2. The assembly is closed with a retaining cap, and spun at the aforementioned speed. Before the core glass has solidified, rotation is stopped. The core melt then falls back into the center of the tube and solidifies to form a preform with a solid center. During rotation, gas trapped within the core melt is forced inward and upward and collects at the top of the preform, which may be disregarded prior to drawing. Also, rotation increases the cooling rate of the core melt, reducing crystallization.

In yet another embodiment of the present invention, a solid preform having a fluoride glass core and cladding may be formed by first spinning a clad glass vertically to eliminate all bubbles prior to its solidification, then, in order to prevent bubbles from being trapped in the core, the core must be cast inside the cladding tube with the mold initially maintained at a slightly inclined position from the horizontal plane, but then is slowly lifted (over about 3 seconds) to a vertical position while continuing to pour the core melt. The undissolved gas is released from the top of the melt and swept away under vacuum, if desired, thus preventing bubble formation. The preforms obtained from the above two embodiments are subsequently drawn into fibers in an essentially inert and/or reactive atmosphere as described earlier.

To the extent practical, the inventive steps of the present method may be practiced together, entirely or in part, or in combination with more conventional methods of forming fluoride glass optical fibers. Optical fibers produced according to the above described embodiments of the present invention have optical properties superior to those of prior art optical fibers.

EXAMPLES

The following examples are illustrative only and are not intended as limiting in any manner.

In the following examples, the molar compositions used for core and cladding fluoride glasses are as follows:

core = 35 to $65MF_4$; 15 to $25BaF_2$; 2 to $5LaF_3$; 10 to $25NaF$; 1.0 to 20LiF; 1 to $7PbF_2$ clad = 35 to $65MF_4$; 15 to $25BaF_2$; 2 to $5LaF_3$; 10 to $25NaF$; 1.0 to 20 LiF, where M is Hf or Zr or a mixture thereof.

The fluoride glasses were melted using all fluoride starting chemicals in a glass box atmosphere of $N_2$ or Ar. Both platinum and vitreous carbon crucibles were used for melting. The melts were heated slowly to around 850° C. and refined for 45 min. The molds used to form preforms, tubes and rods were made from aluminum, copper, inconel, brass and nickel.

EXAMPLE 1

Figure 5:
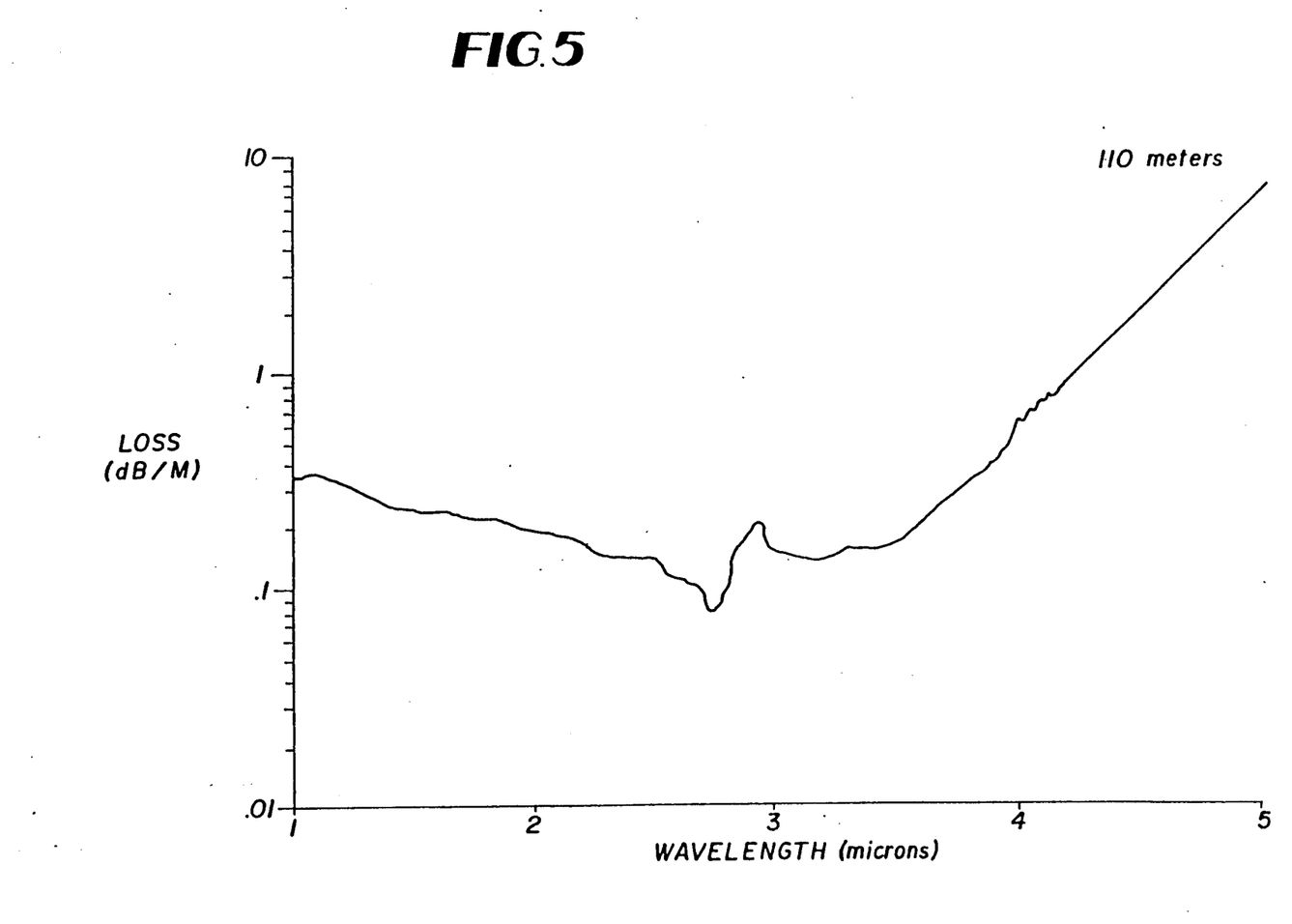
FIG. 5 is a graph of optical loss v. wavelength for a fiber produced in accordance with Example 1.

22 g of fluoride cladding glass melt was poured at 625° C. into a cylindrical brass mold, 13 mm inside diameter and 120 mm long, pre-heated at 285° C. The mold was then capped and rotated vertically. The melt solidified into a cladding tube 1 mm thick and 12 mm long. Next, 43 g of core melt was cast at 525° C. into the cladding tube and the mold was then recapped and again vertically rotated. The core melt spread uniformly over and coated the inner wall of the cladding tube. The coated layer is 3.5 mm thick. A tube preform consisting of a 1 mm clad, a 3.5 mm core and a 4 mm hollow bore was obtained. The tube preform was annealed for 1 hr at 280° C. and then removed from the mold. The tube preform was polished on the surface and was then chucked on one side as shown in FIG. 4 for direct fiberization. The bore of the preform was kept under vacuum, and "FREON 22" was used as a scavenger gas on the outside of the preform which decomposed and reacted with water in the glass dome which was then swept away by He, both flowing at 0.7 cubic feet per hr. The drawing temperature was set at 350° C. and the draw speed was controlled at 9 m/min. The fiber was run through a coating cup containing an acrylate resin which was cured with a UV Fusion furnace. The fiber thus obtained is 150 m long, with a 150 micron core, 200 micron clad, and 250 micron in overall diameter. When examining the fiber with a 20 mW He-Ne laser beam, the light scattering from the fiber was very dim, indicating the absence of scattering crystalites and bubble defects. When examining sections of the fiber using a polarized light microscope at 50× magnification no visible scattering centers were detected. As shown in FIG. 5, the lowest attenuation of the fiber was 0.06dB/m at 2.55 microns, most of it having been confirmed by laser calorimetry measurements to be absorption losses due to the presence of transition metal impurities in the glass.

EXAMPLE 2

Figure 6:
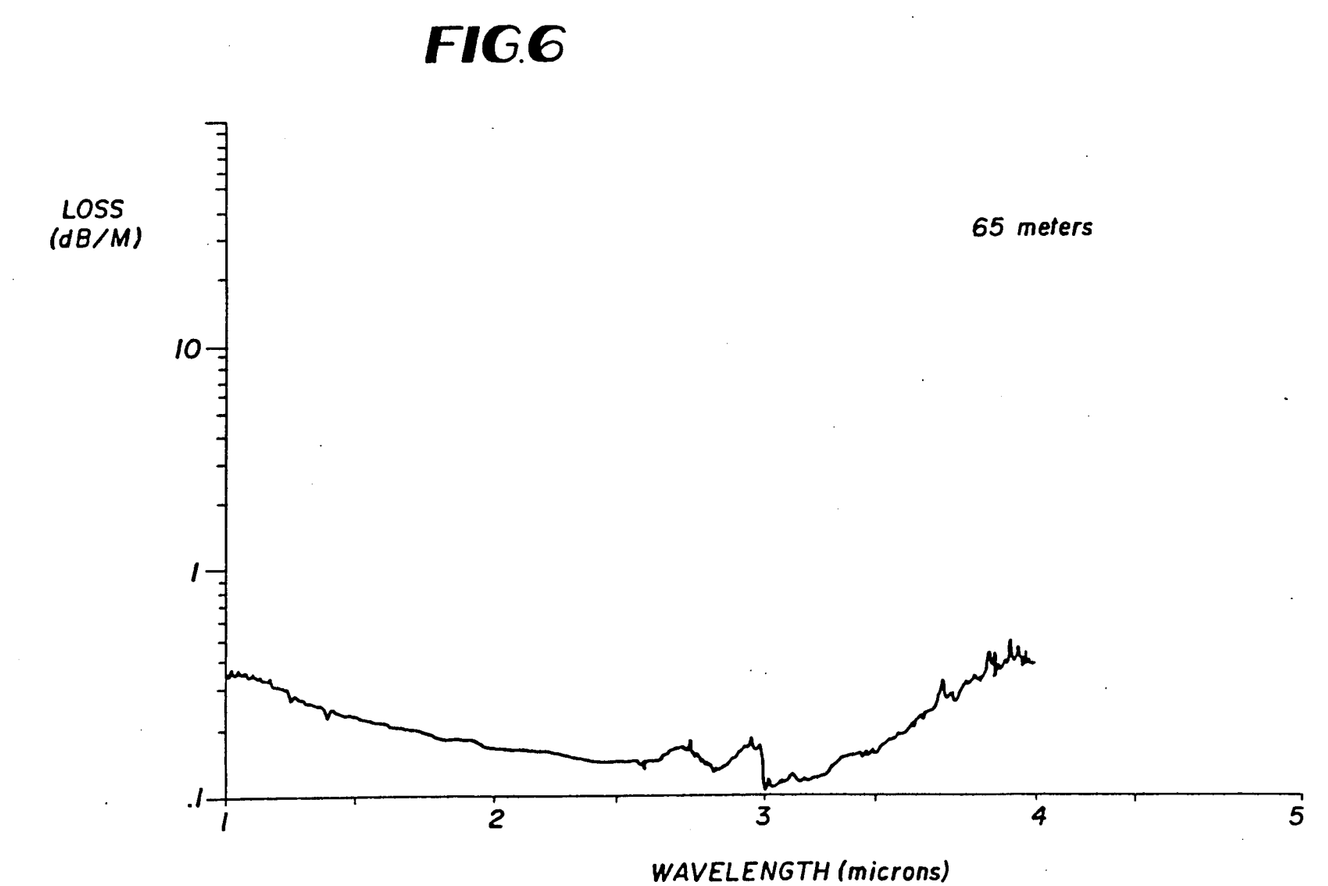
FIG. 6 is a graph of optical loss v. wavelength for a fiber produced in accordance with Example 2.

Using the process described in Example 1, a tube preform of 1 mm clad, 3 mm core, 3.5 mm bore and 100 mm long was obtained. The preform was subjected to direct fiber drawing using the apparatus shown in FIG. 4. Mixtures of $CF_4/O_2$ and $He/N_2$ were used as the reactive gases and sweeping inert gases, respectively, at a flow rate of 0.7 cubic feet per hr., inside and outside of the preform. This fiber draw was carried out at 340° C. with a draw speed of 6 m/min. The fiber obtained has a 260 micron core, 350 micron clad and is 400 microns in overall diameter and 70 m in length. The spectral loss curve for the fiber, shown in FIG. 6, exhibits relatively good optical transmission of less than 0.15dB/m loss between 2 and 5 microns, a wavelength region of interest for many mid-infrared applications.

EXAMPLE 3

Figure 7:
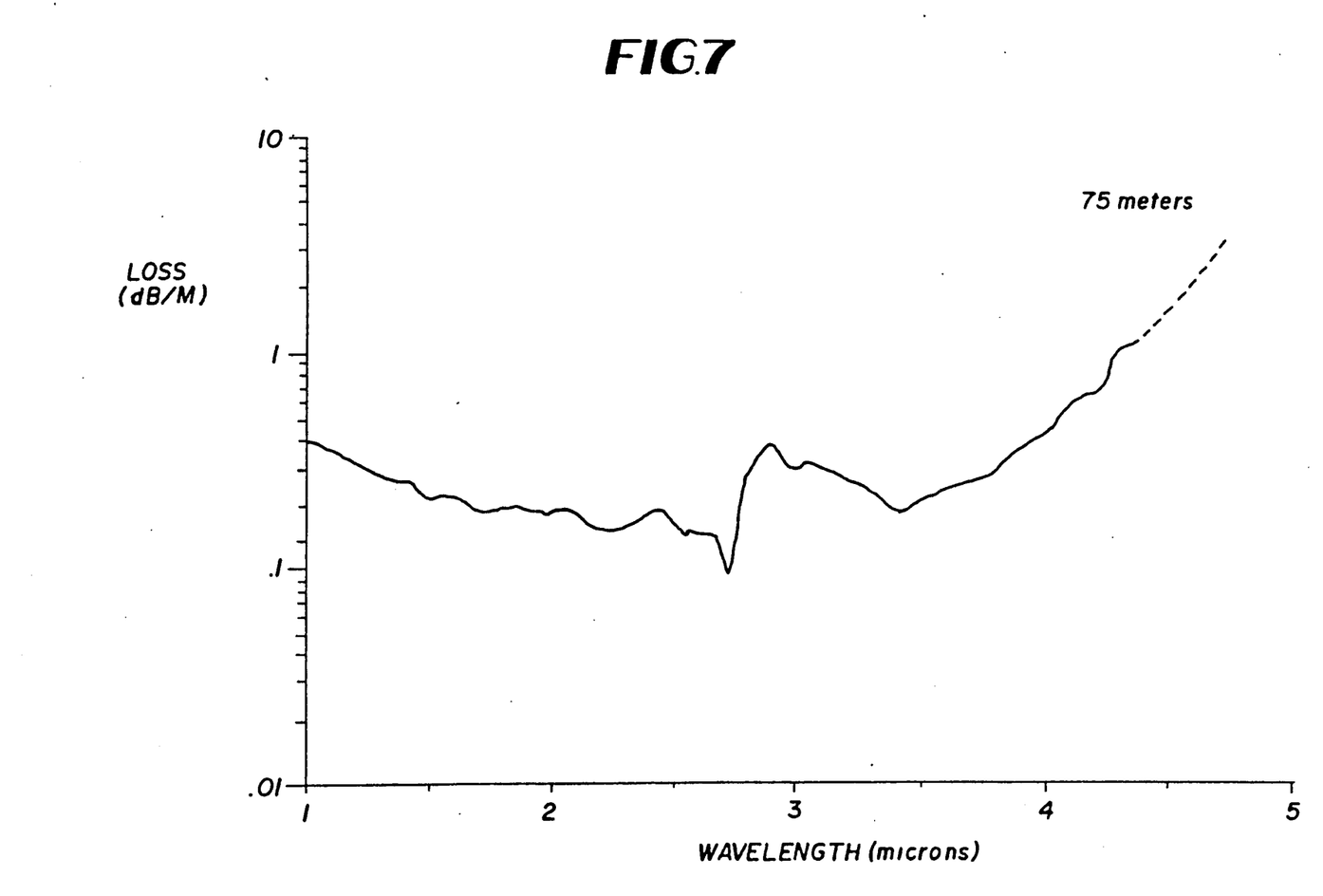
FIG. 7 is a graph of optical loss v. wavelength for a fiber produced in accordance with Example 3.

Using the process described in Example 1, a tube preform 1.5 mm thick, 2.5 mm core, 3.5 mm bore and 10 mm long was prepared. Prior to fiber drawing, the preform was collapsed using the apparatus described in FIG. 4. The collapsing step was carried out at a feed rate of 7 mm/min and a temperature of 330° C. After collapse, the solid preform, 4 mm core and 6.5 mm clad, was fiberized at 350° C. with a draw speed of 9 m/min into 80 m of fluoride fiber, 125 micron core, 200 micron clad, 280 micron overall. $NF_3$, Ar and He were used through the process with a flow rate of 0.5 cubic feet per hr. As shown in FIG. 7, the fiber exhibited a minimal total attenuation of 0.8 dB/m at 2.55 microns, 80 percent of which was measured by laser calorimetry to be absorption losses.

EXAMPLE 4

Figure 8:
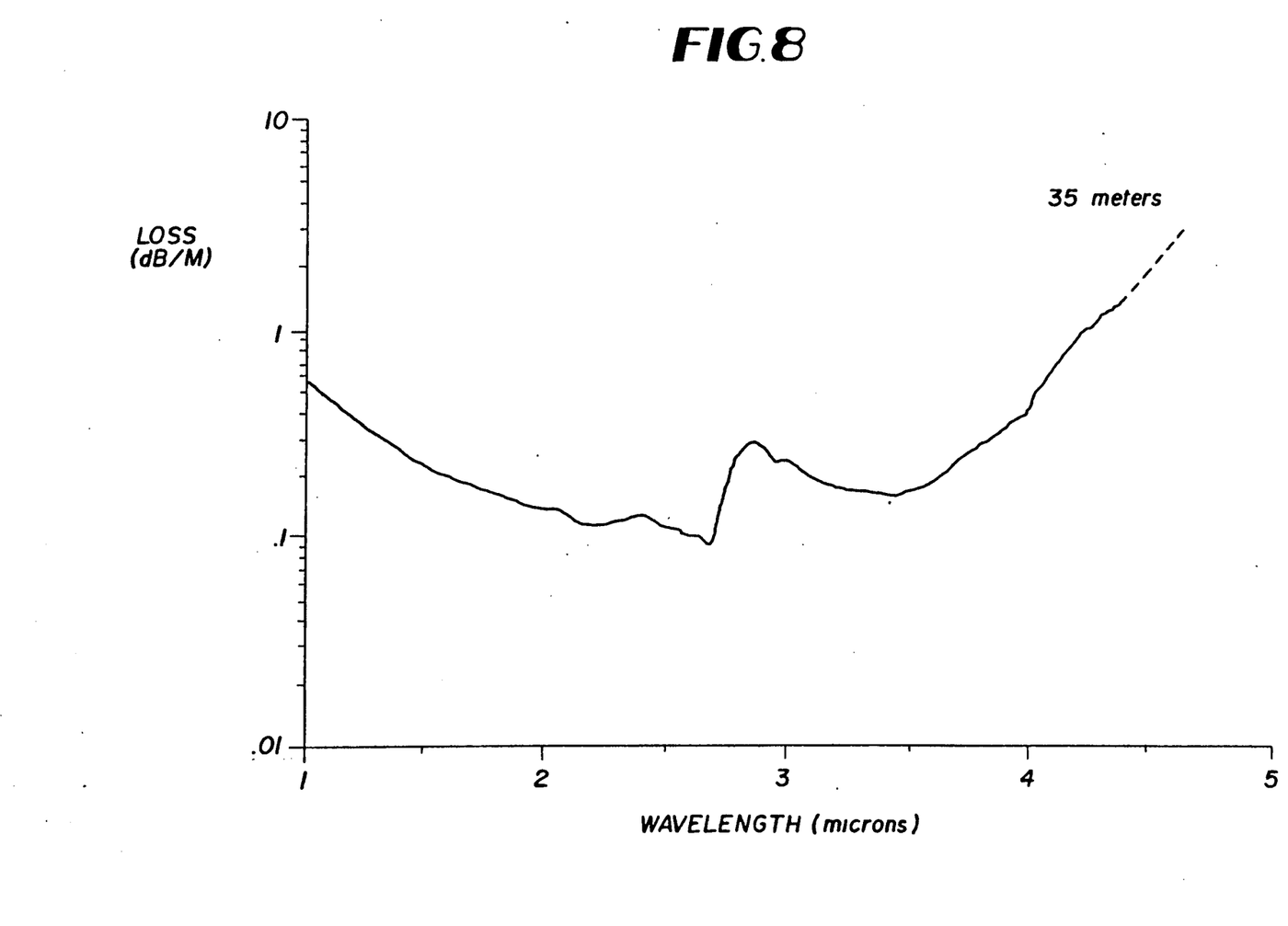
FIG. 8 is a graph of optical loss v. wavelength for a fiber produced in accordance with Example 4.

25 g of core glass melt were poured at 525° C. into an aluminum mold pre-heated at 285° C., then annealed for 1 hr. A solid glass rod, 8 mm in diameter and 100 mm long was obtained. The rod was optically polished and was inserted inside a cladding tube, 10 mm outside diameter, 8 mm inside diameter and 100 mm long, prepared in the manner described in Example 1. The fluoride glass cladding tube was subsequently collapsed over the fluoride glass rod using the process described in Example 4, except $SF_6$ and Ar were used as reactive and inert gases. After closing, the solid preform, 6.8 mm core and 10.5 mm clad, was examined under a polarized light microscope at 50× magnification. No crystalline defects or bubbles could be detected. The preform was fiberized as in Example 3 with plasma emitted F acting as a scavenger gas and He as an inert gas. The fiber obtained was 125 m long, 160 micron core, 250 micron clad and 350 micron in overall diameter. The fiber spectral loss characteristics are given in FIG. 8.

EXAMPLE 5

17g of fluoride glass cladding melt was poured into a nickel mold of 12 mm bore and 100 mm length, preheated at 285° C. The mold was capped and rotated to form a cladding tube with 1 mm wall thickness. Next, 30g of core glass melt was cast inside the tube at 550° C. The mold was recapped then rotated for a few seconds. The core melt was spun then fell back inside the tube to form a solid preform which was elongated and fiberized in a manner described in Example 3 using $CHF_3$ and He at a flow rate of 0.5 cubic feet per hr. The 200 m fiber obtained has 205 micron core, 250 micron clad and 325 microns in overall diameter. Loss measurements performed on the fiber at 2.9 microns, an operational wavelength of interest for medical laser surgery using an Er YAG laser, showed a low attenuation of 0.12 dB/m. The fiber, tested for power handling with the Er-YAG laser, survived up to 135 m per pulse.

EXAMPLE 6

Figure 9:
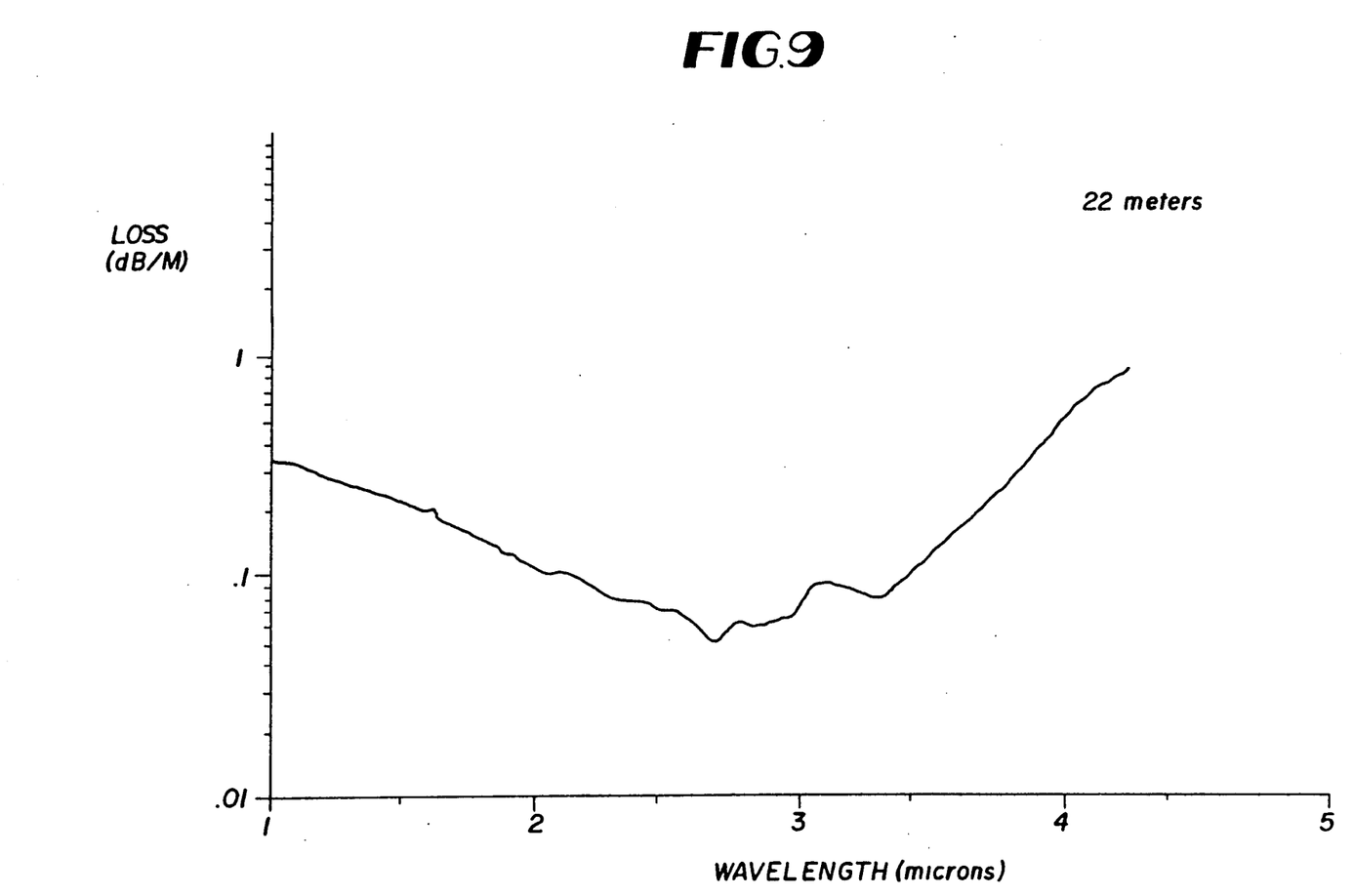
FIG. 9 is a graph of optical loss v. wavelength for a fiber produced in accordance with Example 5.

30g of glass cladding melt was cast at 625° C. into a cylindrical brass mold preheated at 285° C. The mold was vertically rotated to form a bubble-free cladding tube, 11 mm OD., 6 mm ID and 100 mm long. The metal mold was then wrapped with heating tape to maintain 285° C. The mold was placed at a 30° inclined angle, then the core melt was slowly poured into the cladding tube. The mold was slowly (over about 3 sec) raised to the vertical position while pouring continued until the tube was filled. The evolved gas was swept under vacuum. A solid preform thus obtained which exhibited no trapped gas bubbles. The elongation and fiberization process was carried out as in Example 5. 25 m of fiber, 360 micron core, 450 clad and 625 micron in overall diameter, was obtained. The fiber spectral loss curve, illustrated by FIG. 9 shows a low maximum attenuation of 0.45 dB/m at 2.55 micron.

EXAMPLE 7

Figure 10:
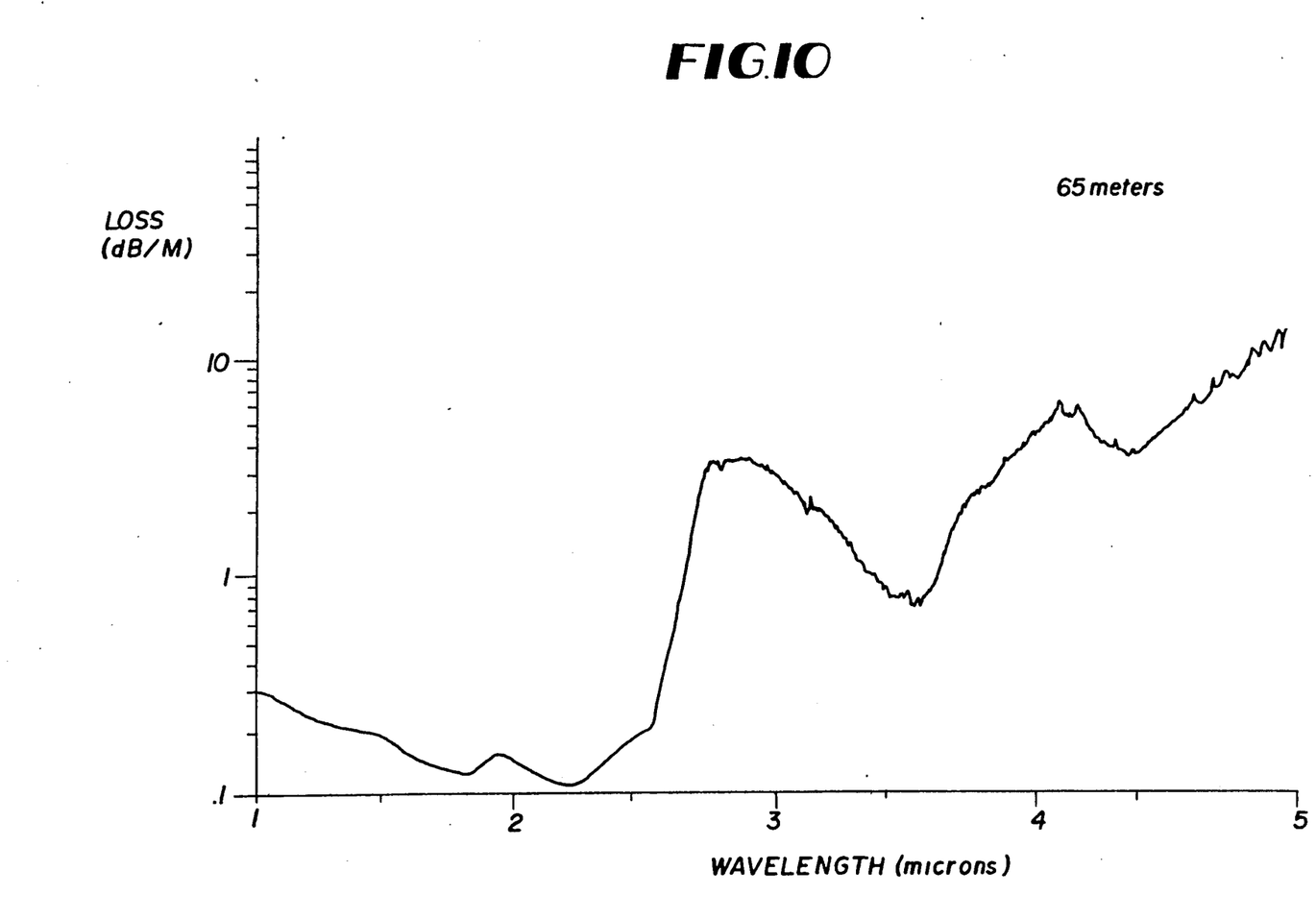
FIG. 10 is a graph of optical loss v. wavelength for a fiber produced in accordance with Example 6.

Following the method of Example 1, a fluoride glass tube, 10 mm OD, 3.5 mm ID and 100 mm long was obtained. The refractive index of the glass was 1.500. The glass tube was introduced snug fit into a fluoropolymer tube having a wall thickness of 0.2 mm and a refractive index of 1.400. The tube-in-tube set up was fiberized using the techniques described in Example 1. 150 m of polymer clad fluoride glass fiber, coated with a moisture-resistant acrylate was obtained. The fiber dimensions were 185 micron core, 200 micron clad and 300 micron overall. The spectral loss curve for the fiber is shown in FIG. 10.

Various changes can be made without departing from the scope of the invention and the invention is not to be considered limited to what is described in the specification and drawings.

What is claimed is:

1. A method of producing an optical fiber having a core and a clad with different indices of refraction, comprising the steps of:

producing a hollow clad tube by spinning a fluoride glass clad metal within a mold until said clad melt solidifies;

initiating pouring of fluoride glass core melt into said clad tube with said clad tube oriented at about 10°-30° from the horizontal, the angle of inclination of said clad tube from the horizontal being sufficiently shallow to provide for the release of bubbles from said core melt; and slowly raising said clad tube to a vertical orientation while continuing to pour said fluoride glass core melt to fill the clad tube hollow and while continuing the release of bubbles from the core melt, and then solidifying the core melt to thereby provide a solid optical fiber preform, said slowly raising of said tube being sufficiently slow such that said preform is provided with no trapped gas bubbles;

removing said solid preform from said mold; and elongating and drawing said solid preform into said optical fiber.

2. The method of claim 1 wherein said solid preform is drawn into said optical fiber under an atmosphere of essentially inert or reactive gas, said reactive gas being selected from the group consisting of $CF_4$, $CHF_3$, $SF_6$, $NF_3$, $SOCl_2$, $CS_2$, $CCl_4$, $PF_5$, $F_2$, $Cl_2$, plasma emitted F, plasma emitted Cl, all fluorocarbons and mixtures thereof; said inert gas being selected from the group consisting of Ar, $N_2$, He, and mixtures thereof.

3. The method of claim 1, wherein the core and/or clad fluoride glass is selected from the group consisting of $ZrF_4$-, $AlF_3$-, $BeF_2$-, and fluorophosphate-based glass.

4. The method of claim 1, wherein each of said steps is conducted while contacting said core glass and/or clad glass with decomposed reactive gas or essentially inert gas.

5. The method of claim 4, wherein said reactive gas is selected from the group consisting of $CF_4$, $CHF_3$, $SF_6$, $NF_3$, $SOCl_2$, $CS_2$, $CCL_4$, $PF_5$, $F_2$, $Cl_2$, plasma emitted F, plasma emitted Cl, all fluorocarbons and mixtures thereof; and wherein said essentially inert gas is selected from the group consisting of Ar, $N_2$, He and mixtures thereof.

6. The method of claim 5, wherein said reactive gases are mixed with an essentially inert gas.

* * * * *